United States Patent
Klotzek et al.

(10) Patent No.: US 9,789,488 B2
(45) Date of Patent: Oct. 17, 2017

(54) DRIVE CONTROL METHOD AND CONTROL DEVICE WHICH OPERATES ACCORDING TO THE METHOD

(71) Applicant: SIEMENS AKTIENGESELLSCHAFT, München (DE)

(72) Inventors: Andreas Klotzek, Erlangen (DE); Andreas Kube, Aachen (DE); Friedhelm Pötter, Bergkamen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 253 days.

(21) Appl. No.: 14/761,050

(22) PCT Filed: Sep. 4, 2013

(86) PCT No.: PCT/EP2013/068261
§ 371 (c)(1),
(2) Date: Jul. 15, 2015

(87) PCT Pub. No.: WO2014/111177
PCT Pub. Date: Jul. 24, 2014

(65) Prior Publication Data
US 2015/0336106 A1    Nov. 26, 2015

(30) Foreign Application Priority Data
Jan. 16, 2013    (DE) .................. 10 2013 200 578

(51) Int. Cl.
*B02C 25/00*    (2006.01)
*H02P 31/00*    (2006.01)
*B02C 15/00*    (2006.01)

(52) U.S. Cl.
CPC ............ *B02C 25/00* (2013.01); *B02C 15/007* (2013.01); *H02P 31/00* (2013.01)

(58) Field of Classification Search
CPC .. B02C 25/00; B02C 15/007; B02C 2015/008
(Continued)

(56) References Cited

U.S. PATENT DOCUMENTS 7,926,754 B2 *   4/2011   Hoffmann ............. B02C 15/006
                                                           241/117
8,128,011 B2 *   3/2012   Berger .................... B02C 15/00
                                                           241/117
(Continued)

FOREIGN PATENT DOCUMENTS

DE    102007033256    1/2009
EP        2492016     2/2011
(Continued)

OTHER PUBLICATIONS

International Search Report issued by the European Patent Office in International Application PCT/EP2013/068261.

*Primary Examiner* — Faye Francis
(74) *Attorney, Agent, or Firm* — Henry M. Feiereisen LLC

(57) ABSTRACT

A method and a device for controlling the drive of a vertical mill having a grinding plate rotatable about the vertical axis are disclosed. The grinding plate can be driven by an electric motor and a drivetrain with a gearbox. An actual rotational speed and a drivetrain torque with respect to the drivetrain are detected and are fed to a control device together with a specified target rotational speed. The control device generates an output signal for a target torque based on the actual rotational speed and the target rotational speed and based on the drivetrain torque such that the resulting target torque is (Continued)

reduced or increased in the same direction as a torque resulting from the milling process.

8 Claims, 4 Drawing Sheets

(58) Field of Classification Search
 USPC .................................... 241/35–36, 117, 119
 See application file for complete search history.

(56) References Cited

U.S. PATENT DOCUMENTS

| | | | |
|---|---|---|---|
| 8,262,006 B2 * | 9/2012 | Berger | B02C 15/006 241/119 |
| 2009/0261190 A1 * | 10/2009 | Hoffmann | B02C 15/006 241/63 |
| 2010/0193616 A1 * | 8/2010 | Berger | B02C 15/006 241/30 |

FOREIGN PATENT DOCUMENTS

| | | |
|---|---|---|
| EP | 2492016 | 8/2012 |
| WO | WO2008/049545 | 5/2008 |

* cited by examiner

DRIVE CONTROL METHOD AND CONTROL DEVICE WHICH OPERATES ACCORDING TO THE METHOD

CROSS-REFERENCES TO RELATED APPLICATIONS

This application is the U.S. National Stage of International Application No. PCT/EP2013/068261, filed Sep. 4, 2013, which designated the United States and has been published as International Publication No. WO 2014/111177 and which claims the priority of German Patent Application, Serial No. 10 2013 200 578.4, filed Jan. 16, 2013, pursuant to 35 U.S.C. 119(a)-(d).

BACKGROUND OF THE INVENTION

The present invention relates to a drive control method, specifically a drive control method for a heavy duty drive, in particular a heavy duty drive of a vertical mill designed to crush brittle materials, for example cement raw materials, as well as a control device for implementing the method and a corresponding drive system for a vertical mill that operates according to the method.

Vertical mills of the type mentioned above with a grinding plate rotating about the vertical and grinding rollers above the grinding plate tend to be subject to significant mechanical oscillation, as in simple terms a vertical mill is an oscillatory system in the form of a damped two-mass oscillator. The first mass includes the grinding plate and all the units moved with the grinding plate and the second mass is the rotor of the driving motor. The connection between these two masses is present in the form of the drivetrain, in other words at least one gearbox included in the drivetrain, both of which function in the manner of a torsion spring in the oscillatory system. The system is made to oscillate jerkily, as well as for short periods or even for longer periods as a result of continuous, low-frequency load changes due to the grinding process as well as random alternating stresses due to the grinding process. The resulting forces and torques can become so significant that the grinding process has to be stopped in order to avoid damage to the drivetrain, in particular specifically to the electric motor and/or gearbox or the system as a whole.

In order to minimize such oscillations until now the operator of the mill had to configure the process parameters, in other words in particular a contact pressure of the grinding rollers, a formula for the material to be ground and quantities of grinding aids to be added, in such a manner that the oscillations stimulated remain below a critical level. However this results in undesirable restrictions in process design which have a negative impact in many areas. The range of products that can be produced using the ground material obtained, the effectiveness of the mill, the energy input required and cost efficiency are among the factors affected.

With this in mind and because of increasing demands relating to availability, efficiency and total cost of ownership, the design and arrangement of the electrical and mechanical components of a drive system and of the respective drivetrain of a heavy duty drive, in particular a vertical mill, are of increasing importance.

Currently drive systems with a gearbox and at least one electric motor in the form of an asynchronous motor, preferably a slip ring rotor, as well as at least one frequency converter supplying the at least one electric motor, present a preferred solution for vertical mills. With this the mill gearboxes are frequently embodied in practice as variants of bevel gear or helical gear planetary gearboxs. The task of the gearbox is to absorb the axial grinding forces and transmit them to the platform as well as to convert the rotational speed and torque.

In practice the control of such a drive system for a vertical mill is essentially faced with the following problems:

In order to be able to insure optimum process management, a first, apparently insignificant task of the drive is to insure the prespecified rotational speed of the grinding plate. As the process torque required at the grinding plate fluctuates, rotational speed control is essential.

The load fluctuations and oscillation stimuli acting on the drive mechanism are characterized by pulse loads, as result for example when the grinding rollers pass over coarse materials being ground, stochastic loads from the grinding process, periodic stimuli from the gearbox and mill kinematics and a varying grinding roller contact pressure. The interaction of these stress influences results in a complex load cycle, which can even instigate resonant oscillation.

In addition to drivetrain oscillation a non-stable grinding bed, in other words a fluidizing grinding bed or one characterized by waviness, can also result in extreme oscillation states of the mill, in particular mill rumble.

Finally the grinding of natural products makes it largely unpredictable how the grinding process should be set to insure quiet running of the mill. It is therefore always a challenge for the operator in control to set the correct process parameters. Ultimately the drive alone can alleviate an unfavorably set process but it cannot correct it.

The approach proposed here deals with a reduction of the stresses acting on the drivetrain during operation of the vertical mill. Until now attempts have been made to reduce such stresses by using couplings in the drivetrain. However a coupling is known to be an expensive part that is subject to wear and the way in which oscillations are damped by means of a coupling is based on the conversion of oscillation energy to heat, which has a negative impact on the energy balance sheet of the vertical mill. It has also proven from observation of vertical mills in operation that the drivetrain oscillations remain at a very high level even when a coupling is used.

SUMMARY OF THE INVENTION

One object of the present invention is therefore to specify a method for controlling the drive of a vertical mill and a control device operating according to the method, which reduces such drivetrain oscillation, in particular a method and a corresponding apparatus, which reduces such drivetrain oscillation without using a coupling in the drivetrain.

The object mentioned above is achieved by a method for controlling the drive of a vertical mill, by a control device, and by a vertical mill or a drive system of a vertical mill with such a control device. The vertical mill also referred to in an abbreviated manner here and in the following as the mill comprises a grinding plate which can be rotated about the vertical and which can be driven and is driven during operation of the mill by at least one electric motor and a drivetrain comprising at least one gearbox.

With the method an actual rotational speed and in respect of the drivetrain a drivetrain torque are recorded, detected and/or determined and supplied to a control device together with a prespecified or prespecifiable target rotational speed. The method is characterized in that the control device generates an output signal for a target torque based on the actual rotational speed and the target rotational speed as well as the drivetrain torque. The output signal for the target torque causes the resulting target torque to be reduced or increased in the same direction as a torque resulting from the grinding process.

With a control device designed to implement such a method and in some instances individual or several embodiments described below, specifically of a control device for controlling the drive of a vertical mill of the type mentioned above and described in the following, a first and second variable, specifically an actual rotational speed and a drivetrain torque detected in respect of the drivetrain can be supplied to the control device as input variables and a prespecified or prespecifiable target rotational speed can be supplied as a further input variable. An output signal for a target torque can be generated by means of the control device based on the actual rotational speed and the target rotational speed as well as the drivetrain torque. The output signal is characterized in that the resulting target torque is reduced or increased in the same direction as a torque resulting from the grinding process.

In brief therefore the invention is a method and apparatus for controlling the drive of a heavy duty arrangement in the form of a drive system, with which the control takes into account the drivetrain torque detected in respect of the drivetrain in addition to the actual rotational speed of the grinding plate. Any oscillations in the drivetrain also result in changes in the rotational speed of the grinding plate (actual rotational speed) and corresponding changes in the rotational velocity of the grinding plate. It has however proven that such oscillations can be identified particularly readily and above all sufficiently quickly based on the drivetrain torque. The approach described here correspondingly provides for the taking into account of the drivetrain torque detected in respect of the drivetrain.

The advantage of the invention is that the specific reducing or increasing of the drive-side target torque reduces dynamic load peaks or allows them to be reduced. The adjustment, in other words the reducing or increasing, of the target torque here takes place in the same direction as the torque resulting from the grinding process in each instance. The reducing of such load peaks brings about a reduction of the stress on the drivetrain mechanical system. Until now the individual components of the drivetrain have always been dimensioned correspondingly to manage such load peaks for safety reasons. This is now no longer necessary, so the individual components of the drivetrain can be produced more economically, weighing less and using fewer materials. This also applies to special loads, for example so called mill rumble. The need also to be able to absorb the stresses occurring during mill rumble in particular has until now resulted in the excessive dimensioning of the components of the drivetrain as set out above. This is also no longer necessary with the approach described here. Also a coupling, which was also always previously provided in the drivetrain, is no longer or no longer mandatorily required.

The actual rotational speed is for example the instantaneous rotational speed of a shaft on the output side of the gearbox and therefore a measure of the instantaneous rotational speed of the grinding plate. Sensors known per se can be used to detect such an actual rotational speed, specifically for example so called incremental encoders. If the electric motor is supplied by means of a frequency converter and the frequency converter is operated in so called encoderless mode, the actual rotational speed does not have to be detected by means of a sensor. Instead the actual rotational speed can be read out directly at the frequency converter. Such reading out of the actual rotational speed is referred to here and in the following as the recording of the actual rotational speed.

The drivetrain torque detected in respect of the drivetrain is for example the mechanical torque acting in the gearbox and it is recorded using a sensor that is similarly known per se, specifically for example a torque sensor. Alternatively to determine the drivetrain torque it is also possible to determine the difference between the positions of two drivetrain locations by measuring the rotational path or one of its temporal derivations in order to conclude the drivetrain torque therefrom. Examples of two such drivetrain locations could be for example a shaft on the input side of the gearbox and the shaft on the output side of the gearbox. The difference between the rotational positions of these two shafts is a measure of the drivetrain torque. The drivetrain torque in respect of the drivetrain can also be detected correspondingly by means of two incremental encoders or the like and appropriate processing of the measurement values obtained from such sensors. A further option for determining drivetrain torque is its calculation based on the air gap torque known to the frequency converter and acting on rotor inertia and the determined acceleration of rotor inertia. A further option for determining drivetrain torque, in particular its dynamic, is to anticipate the change in drivetrain torque based on a rotational angle coordinate only determined at one drivetrain location, in particular the grinding plate, or one of its temporal derivations. All these options should be deemed to be covered by the formulation of recording, detection or determination used here and in the following.

As a result of the detection of the drivetrain torque and the fact that it is taken into account by the control device the drive-side target torque can be increased or reduced in the same direction as the drivetrain torque. For clarification this can also be described as follows: that in the case of a torque resulting from the grinding process, which suddenly counteracts the target torque to a significant degree (counter torque) and would therefore normally result in an increase in torsion in the drivetrain, said torsion and the associated stress on the drivetrain are avoided or reduced in that the target torque is changed in the same direction as the torque resulting from the grinding process, in this instance being reduced. One cause of the increased counter torque described above is for example the passing of the grinding rollers over coarse material on the grinding bed.

The detected drivetrain torque is a measure of a torque resulting from the grinding process, more specifically a measure of the difference between the target torque induced in the drivetrain by the or each electric motor and the torque coupled into the drivetrain on the take off side as a result of the grinding process. The drivetrain torque is therefore also a measure of torsion in the drivetrain. If the counter torque is increased suddenly, leading to an instantaneous reduction of the rotational velocity of the grinding plate, the control device brings about a reduction in the target torque output as the reference variable for the or each electric motor (the drive then does not also still set itself against the counter torque originating from the process but it evades the counter torque by means of an instantaneous reduction of the target torque). When the counter torque is reduced suddenly, leading to an instantaneous increase in the rotational velocity of the grinding plate, the control device brings about an increase in the target torque output as the reference variable for the or each electric motor. In both instances the torsion change in the drivetrain resulting without such a concordant adjustment of the target torque is avoided or at least reduced.

This brings about a reduction in the mechanical stress in the drivetrain and allows the drivetrain to be designed without the hitherto standard excessive dimensioning. The hitherto standard excessive dimensioning was provided specifically to absorb such forces occurring due to the previously accepted torsion in the drivetrain. This reduction or increase in target torque in the same direction as the suddenly variable torque resulting from the grinding process leads to an instantaneous change in the rotational speed of the motor so that said motor is adjusted to the suddenly changed rotational speed of the grinding plate. In addition to the concordant reduction or increase in the target torque, the control device also insures that the rotational speed of the grinding plate remains constant or at least essentially constant.

Advantageous configurations of the invention are the subject matter of the subclaims. Back references used there indicate the further development of the subject matter of the main claim by means of the features of the respective subclaim. They should not be seen as a renunciation of the achievement of independent, objective protection for the feature combinations of the subclaims to which back reference is made. It is also assumed in respect of an interpretation of the claims when rendering a feature more specific in a secondary claim that such a restriction is not present in the respectively preceding claims. Finally it should be noted that the method specified here can also be developed according to the dependent apparatus claims and vice versa.

In one embodiment of the method the control device comprises a rotational speed controller and a torque controller. The rotational speed controller outputs a first controlled variable (controlled variable of the rotational speed controller) based on the actual rotational speed and the target rotational speed. The torque controller acts on the output of the rotational speed controller, in other words on the first controlled variable output by the rotational speed controller. The concordant reduction or increase in the resulting target torque is achieved in this manner with this embodiment of the method. To this end the torque controller outputs a second controlled variable (controlled variable of the torque controller) based on the detected drivetrain torque. The at least one electric motor is then activated to reduce or increase the target torque in the same direction as the torque resulting from the grinding process based on a combination, in particular an addition, of the controlled variables output by the rotational speed controller and the torque controller.

A control device designed for the implementation of this specific form of the method comprises a rotational speed controller and a torque controller acting on the output of the rotational speed controller. A first controlled variable can be output by means of the rotational speed controller based on the actual rotational speed and the target rotational speed and a second controlled variable can be output by means of the torque controller based on the detected drivetrain torque. The at least one electric motor can be activated by means of the control device to reduce or increase the target torque in the same direction as the torque resulting from the grinding process based on a combination, in particular an addition, of the controlled variables output by the rotational speed controller and the torque controller.

The use of a rotational speed controller and a torque controller and the combination, in particular addition, of the controlled variables output by these two controllers in each instance are therefore an example of means for reducing or increasing the target torque for the electric motor in the same direction as the torque resulting from the grinding process and a possible embodiment of the reducing or increasing of the target torque for the electric motor in the same direction as the torque resulting from the grinding process. The controlled variable output by the rotational speed controller only results in a target torque for maintaining a largely constant rotational speed of the grinding plate. The controlled variable output by the torque controller and its superimposition with the controlled variable output by the rotational speed controller lead to an adjustment of the resulting target torque according to the drivetrain torque detected in each instance. This adjustment brings about for example a reduction in the target torque if it is identified from the detected drivetrain torque that an increased counter torque acts on the drivetrain due to the grinding process. Conversely this adjustment brings about an increase in the target torque if it is identified from the detected drivetrain torque that a reduced counter torque acts on the drivetrain due to the variable load torque from the grinding process.

In one specific embodiment of the drive control method and a control device operating according to the method the torque controller comprises a highpass filter and an adjoining filter stage for amplifying the dynamic of the highpass filtered drivetrain torque. In respect of the method the detected drivetrain torque is highpass filtered and the dynamic of the resulting highpass filtered drivetrain torque is then amplified in the context of the functionality of the torque controller. Highpass filtering therefore takes place using the highpass filter which is part of the torque controller or a comparable functionality. The dynamic of the highpass filtered drivetrain torque is amplified by means of a gearbox element with a differentiating response (D element) which is also part of the torque controller.

If the or each electric motor is supplied by a frequency converter, the resulting target torque, in other words the superimposition, in particular addition, of the two target torques generated by the rotational speed controller and the torque controller within the control device, can be supplied to the frequency converter, which then insures activation of the or each electric motor in the manner known in principle per se, so the target torque results in the drivetrain.

An exemplary embodiment of the invention is described in more detail below with reference to the drawing. Corresponding objects or elements are shown with identical reference characters in all the figures.

It should also be noted that the approach described here and individual, and in some instances combined, embodiments can also be combined with the approach and specific embodiments described in the concurrently filed US patent applications by to the same inventor, having the attorney docket numbers Kube, Kube-2, Kube-3 and Kube-4 (official application number not yet known). To this extent the full disclosure content of said parallel applications, specifically in respect of the periodic variation of the rotational speed of the grinding plate described there and pattern detection in a measurement value sequence and adjustment of the rotational speed of the grinding plate in the event of an identified pattern, is incorporated in the present specification by reference. Each such option for adjusting the rotational speed of the grinding plate and also both options together can be combined with the method described here and the regulating device operating according to the method, for example in that the target torque output at the output of the regulating device is adjusted for the periodic variation of the rotational speed of the grinding plate or due to an identified pattern. The options for adjusting the rotational speed of the grinding plate described in the parallel applications and also both options together can also be combined with the method described here and the regulating device operating according to the method, in that the rotational speed target value supplied to the rotational speed regulator of the regulating device is adjusted.

The exemplary embodiment should not be seen as a restriction of the invention. Rather changes and modifications are also possible in the context of the present disclosure, in particular such variants and combinations as will emerge for the person skilled in the art in respect of the achievement of the object by the combination or modification of individual features or elements or method steps described in conjunction with the general or specific part of the description and contained in the claims and/or drawing and result in a new subject matter or new method steps or method step sequences based on combinable features.

DETAILED DESCRIPTION OF PREFERRED EMBODIMENTS

Figure 1:
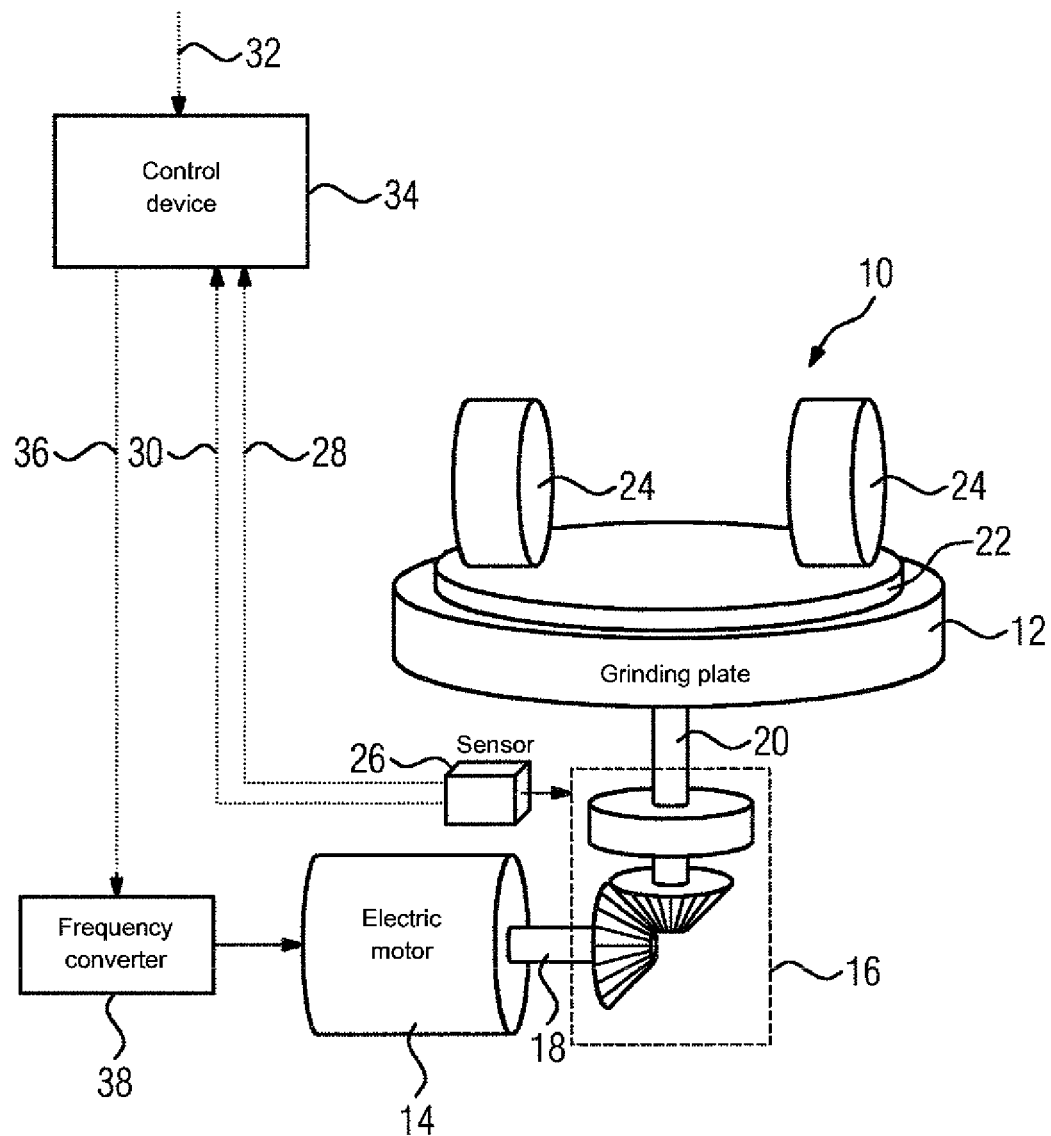
FIG. 1 shows a highly simplified schematic diagram of a vertical mill with a grinding plate driven by means of a heavy duty drive.

FIG. 1 shows a highly simplified schematic diagram of a vertical mill 10 for crushing brittle materials, for example cement raw materials. The vertical mill 10 comprises a grinding plate 12 which can be rotated about the vertical. The grinding plate 12 is driven by means of a heavy duty drive in the form of at least one motor, in particular at least one electric motor 14, and in the example illustrated here by means of a gearbox 16 present between the or each electric motor 14 and the grinding plate 12. The gearbox 16 here is shown as a bevel gearing with an adjoining planetary gearbox (not shown in detail) without renouncing greater generality. The gearbox 16 can also comprise for example a helical gearing or the like and/or an upstream or adjoining planetary gearbox or the like.

The vertical mill 10 comprises at least one driven shaft. In the diagram in FIG. 1 the vertical mill 10 comprises a motor shaft 18 as the drive-side shaft and a grinding plate shaft 20 as the take off-side shaft. All the means for transmitting the drive force of the electric motor 14 to the grinding plate 12 are referred to as the drivetrain. The drivetrain here includes at least the gearbox 16 and the grinding plate shaft 20.

During operation of the vertical mill 10 the or each electric motor 14 causes the grinding plate 12 to rotate by means of the drivetrain. As a result of the grinding process and as a result of materials supplied, which are to be ground and are already ground, a grinding bed 22 is present on the grinding plate 12, in other words a mixture of ground items and items to be ground. The grinding effect is achieved in that a grinding roller 24 or a number of grinding rollers 24 are pressed onto the grinding bed 22 and the rotating grinding plate 12 on the one hand due to their weight but on the other hand in some instances also due to additionally applied forces, which are applied for example by means of a hydraulic cylinder or the like engaging with a pivotably supported grinding roller 24.

The vertical mill 10 is generally an oscillatory system and specifically the vertical mill 10 tends to be subject to significant mechanical torsional oscillations in the drivetrain. The resulting forces and torques can be so significant that the mechanical components of the drivetrain, in other words for example the gearbox 16, are subject to extreme or excessive strain.

Until now attempts have been made to counteract such torsional oscillations using a coupling or the like, for example a highly elastic elastomer coupling. Such a coupling is arranged (not shown) for example between the gearbox 16 and the grinding plate 12. Such a coupling cannot compensate for oscillations in the rotational velocity of the grinding plate 12 but it prevents or reduces the gearbox of such oscillations to the gearbox 16 and the electric motor 14.

It is proposed here that for example a sensor system 26 assigned indirectly or directly to the drivetrain is used to detect values of relevance to oscillation, specifically at least one value or measurement value for an instantaneous rotational speed of a rotating part of the gearbox 16 or of the grinding plate 12 and at least one measurement value for a mechanical torque acting in the drivetrain. The detected instantaneous measurement value here is a measure of the torque or gearbox torque transmitted by means of the gearbox 16, in other words a measure of a torque referred to as the torque that is mechanically active in the drivetrain, in particular in the gearbox 16, to differentiate it from an electrical torque acting on the electric motor 14. The detected rotational speed measurement value and the detected measurement value for the mechanical torque are referred to in the following as the actual rotational speed 28 or drivetrain torque 30. The two detected or recorded values or measurement values 28, 30 are supplied to a control device 34 together with a target rotational speed 32. The control device 34 generates an output signal 36 for a target torque, which is supplied to a frequency converter 38 for corresponding activation of the or each electric motor 14. As a result of such activation the or each electric motor 14 generates the target torque requested with the output signal 36 during operation of the vertical mill 10. If a frequency converter 38 is used to supply the or each electric motor 14 and the frequency converter 38 is operated in a specific operating mode, specifically so called encoderless mode, the instantaneous rotational speed can also be read out in the manner known per se from a memory of the frequency converter 38. An actual rotational speed 28 recorded in this manner is not a measurement value but is formed in the frequency converter 38 as the or each electric motor 14 is supplied. The obtaining of the actual rotational speed 28 on this basis is referred to as the recording of the actual rotational speed 28 to differentiate it from an actual rotational speed 28 detected by measurement.

Figure 2:
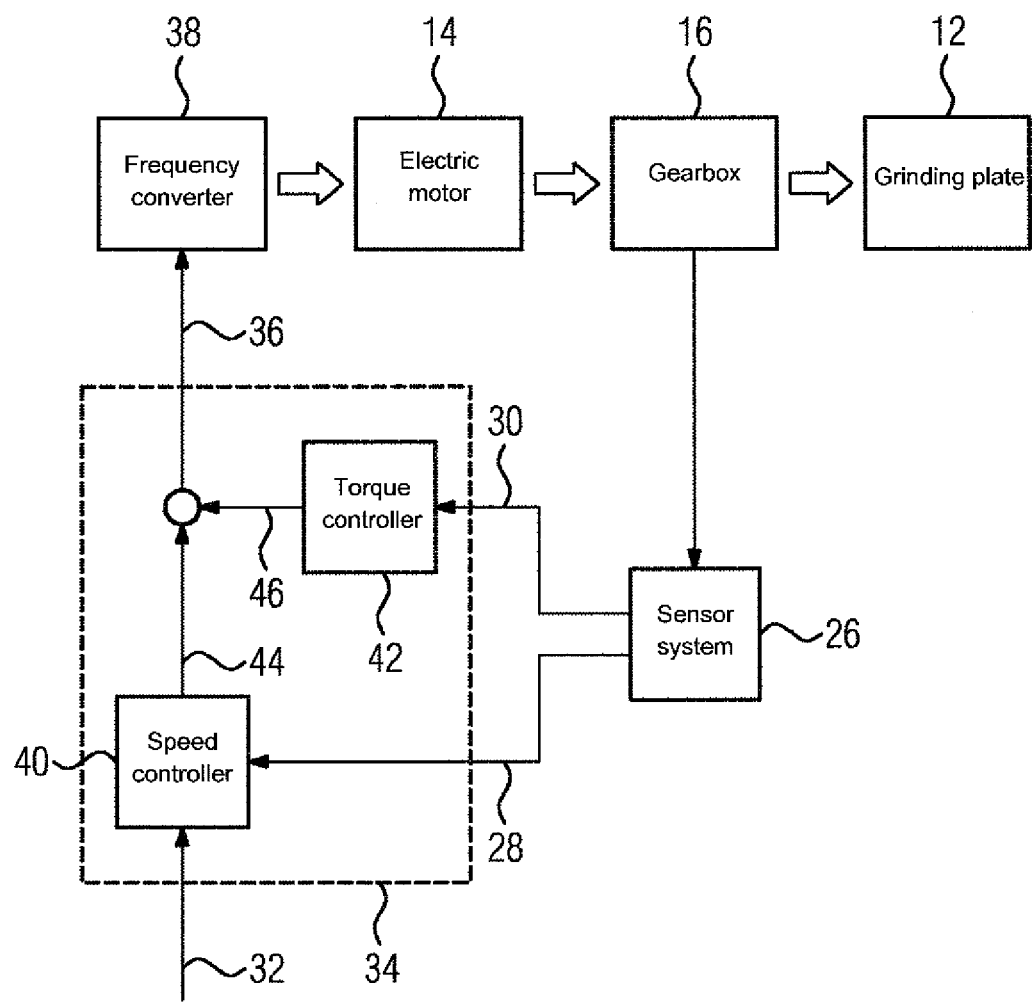
FIG. 2 shows the vertical mill as an event chain together with a control device designed for controlling the drive of the vertical mill.

The diagram in FIG. 2 shows individual elements of the vertical mill 10 as an event chain and the control device 34 in further detail. According to this the control device 34 comprises a rotational speed controller 40 and a torque controller 42. The actual rotational speed 28 and the drivetrain torque are supplied to the control device 34 as input variables and a prespecified or prespecifiable target rotational speed 32 is supplied as a further input variable. The rotational speed controller 40 is used to output a first controlled variable 44 based on the actual rotational speed 28 and the target rotational speed 32, said controlled variable 44 being referred to as the controlled variable of the rotational speed controller 40 for the purpose of differentiation. The torque controller 42 acts on the output of the rotational speed controller 40 in such a manner that the output of the rotational speed controller 40, in other words the first controlled variable 44, and a second controlled variable 46 output at the output of the torque controller 42 are superimposed. Superimposition takes place here for example in that the two controlled variables 44, 46 are added. The second controlled variable 46 output by the torque controller 42 is based on the detected drivetrain torque 30, which is supplied to the input of the torque controller 42. The second controlled variable 46 output by the torque controller 42 is also referred to as the controlled variable of the torque controller for the purpose of differentiation. The controlled variable 44 of the rotational speed controller 40 and the controlled variable 46 of the torque controller 42 are a measure of a first and second target torque for the or each electric motor 14. The or each electric motor 14 is activated to drive the grinding plate 12 by means of the control device 34 based on a superimposition, in particular an addition, of the two controlled variables 44, 46 and the resulting output signal 36.

Figure 3:
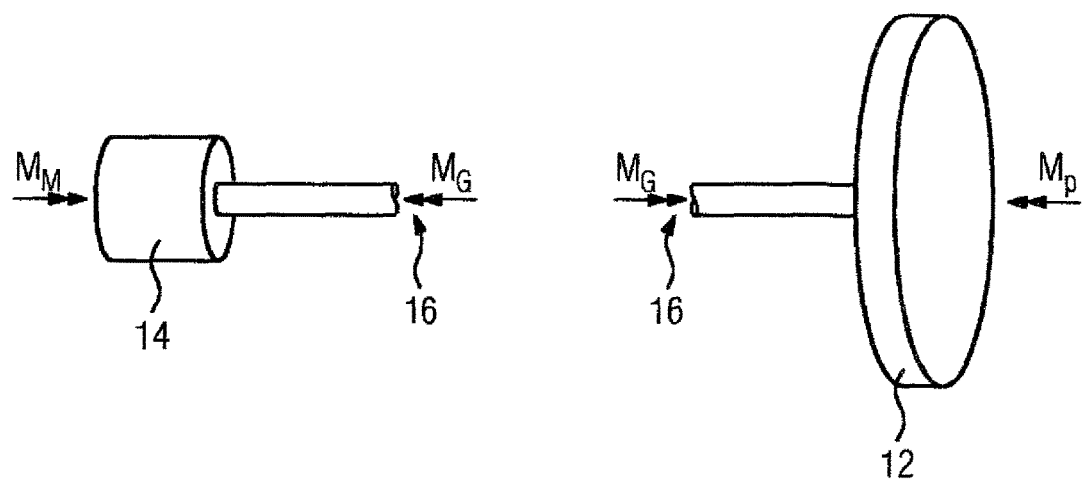
FIG. 3 shows a diagram clarifying the vectorial directions of the considered torques.

For clarification the schematically simplified diagram in FIG. 3 shows the torques in the vertical mill 10 considered in the approach described here. On the left side is the drive-side subsystem with the electric motor 14 and on the right side is the take off-side subsystem with the grinding plate 12. Both subsystems are coupled by the gearbox 16. The or each electric motor 14 applies a motor torque $M_M$ based on the prespecified target torque. The drivetrain torque 30 acts in the drivetrain, being shown here as the gearbox torque $M_G$ acting in the gearbox 16. The variable load torque from the grinding process means that a process torque $M_P$ acts on the drivetrain by way of the grinding plate 12. If the process torque $M_P$ changes suddenly, it causes an acceleration of the grinding plate, associated with a reduction of tension in the drivetrain, in other words a torque change in the drivetrain torque $M_T$. In order to counteract this torque dynamic, the target torque is increased and therefore the motor torque $M_M$ is increased, so the rotor of the motor is accelerated in the same direction and there is no change in the torsion in the drivetrain. This is referred to as a change in the target torque in the same direction as the torque resulting from the grinding process. It is a result of a concordant change in the output signal 36 for the target torque. If the process torque $M_P$ increases suddenly, for example because one of the grinding rollers 24 passes over a larger chunk of material, it leads to a reduction of the target torque and therefore a reduction of the motor torque $M_M$, so the torsion in the drivetrain does not increase. This also corresponds to a change in the output signal 36 for the target torque in the same direction as the torque change resulting from the grinding process.

Figure 4:
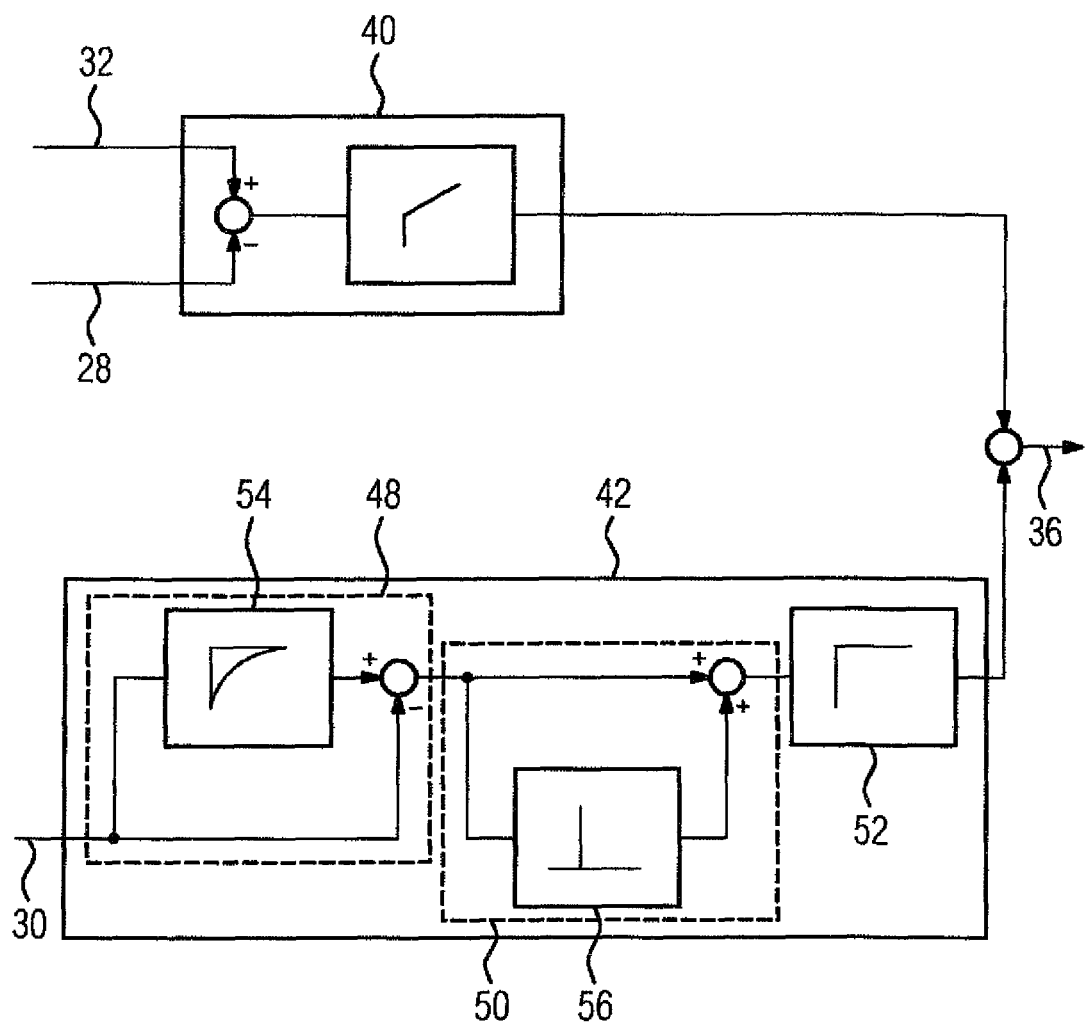
FIG. 4 shows further details of the control device.

The diagram in FIG. 4 shows the control device 34 in even more detail. According to this the rotational speed controller 40 is implemented for example as a PI controller. The torque controller 42 comprises a first segment functioning as a highpass (highpass filter 48), a second, central segment, in which the dynamic of the resulting highpass filtered drivetrain torque is amplified (filter stage 50) and a final, third segment with a proportional element (P element 52).

In the illustrated embodiment the highpass filter 48 is implemented by means of a lowpass filter 54, from the output of which the unfiltered drivetrain torque 30 is subtracted. The filter stage 50 comprises a gearbox element with a differentiating response (ID element 56), the output of which represents the change velocity of the drivetrain torque. The adding of the highpass filtered drivetrain torque and the output of the D element 56 brings about the intended amplification of the dynamic of the highpass filtered drivetrain torque. As a last functional unit the rotational speed controller 42 comprises a gearbox element with a proportional response as a P element 52, at the output of which the target torque of the torque controller 42 results.

All the cited functional segments of the torque controller 42 are optional per se. This is expressed in that the lowpass filter 54, the ID element 56 and the P element 52 can be parameterized individually. If for example the amplification factor of the P element 52 is selected as "1", the P element 52 could instead be dispensed with entirely, with the result that the degree of freedom of parameterization is surrendered, as there is then no longer any amplification of the signal supplied to the input of the P element 52. Corresponding selection of the parameters of the lowpass filter 54 and the D element allows these to be deactivated.

When the vertical mill 10 is brought into operation, appropriate parameters are set for the individual functional segments of the torque controller 42. If the torque controller 42 does not comprises a D element 56 for example, the torque controller 42 does not take into account the change in velocity of the drivetrain torque 30 to the degree to which this is possible with an embodiment in which the torque controller 42 comprises such a D element 56. This does nothing to alter the fact that with the method described here for controlling the drive of the vertical mill 10 and the corresponding control device 34 for implementing the method a torque controller 42 can also be used, which does not comprise the described filter stage 50 and therefore also the D element 56 there. The same applies to the first and third segments of the torque controller 42 with the lowpass filter 54 or P element 52 there.

Although the invention has been illustrated and described in detail using the exemplary embodiment, the invention is not restricted by the disclosed example(s) and other variations can be derived therefrom by the person skilled in the art without departing from the scope of protection of the invention.

Individual prominent aspects of the description submitted here can be summarized briefly as follows: A method for controlling the drive of a vertical mill 10 with a grinding plate 12 which can be rotated about the vertical and a control device 34 designed to implement the method are specified, the grinding plate 12 being driven by at least one electric motor 14 and a drivetrain comprising at least one gearbox 16 during operation of the vertical mill 10. An actual rotational speed 28 and a drivetrain torque 30 determined in respect of the drivetrain as well as a prespecified or prespecifiable target rotational speed 32 are supplied to the control device 34 as input variables. The control device 34 functions as means for reducing or increasing the target torque of the electric motor 14. The target torque here is reduced or increased in the same direction as a torque resulting from the grinding process. To this end the control device 34 generates an output signal 36 for a target torque based on the actual rotational speed 28 and the target rotational speed 32 as well as the drivetrain torque 30. This causes the resulting target torque to be reduced or increased in the same direction as a torque resulting from the grinding process. The at least one electric motor 14 is activated based on the output signal 36.

What is claimed is:
1. A method for controlling a drive of a vertical mill performing a grinding process, with the vertical mill having a grinding plate rotatable about a vertical axis and drivable by at least one electric motor and a drivetrain comprising at least one gearbox, measuring an actual rotational speed of the drivetrain and a drivetrain torque or a dynamics of the drivetrain torque, supplying the measured actual rotational speed of the drivetrain and the measured drivetrain torque or the measured dynamics of the drivetrain torque to a control device, together with a predefined target rotational speed, generating with the control device an output signal for a target torque based on the measured actual rotational speed of the drivetrain and the measured drivetrain torque or the measured dynamics of the drivetrain torque in such a manner that the resulting target torque is reduced or increased in an identical direction as a torque resulting from the grinding process.

2. The method of claim 1, wherein the control device comprises a rotational speed controller having an output for outputting a first controlled variable based on the actual rotational speed and the target rotational speed, and a torque controller which operates on the output of the rotational speed controller and outputs a second controlled variable based on the detected drivetrain torque, the method further comprising controlling the at least one electric motor by adding the first and second controlled variables in order to reduce or increase the target torque in the identical direction as a torque resulting from the grinding process.

3. The method of claim 2, further comprising highpass-filtering the measured drivetrain torque and thereafter amplifying the dynamics of the resulting highpass-filtered drivetrain torque.

4. The method of claim 1, wherein the measured drivetrain torque is determined based on a difference between positions of two drivetrain locations.

5. A control device for controlling a drive of a vertical mill performing a grinding process, with the vertical mill having a grinding plate rotatable about a vertical axis and drivable by at least one electric motor and a drivetrain comprising at least one gearbox, wherein the control device comprises:

an input configured to receive a measured actual rotational speed of the drivetrain and a measured drivetrain torque of the drivetrain torque, and to receive a predefined target rotational speed, and an output supplying an output signal for a target torque based on the measured actual rotational speed of the drivetrain and based on the target rotational speed as well as on the drivetrain torque in such a manner that the resulting target torque is reduced or increased in an identical direction as a torque resulting from the grinding process.

6. The control device of claim 5, further comprising:

a rotational speed controller and a torque controller operating on an output of the rotational speed controller, wherein the rotational speed controller supplies at the output a first controlled variable based on the measured actual rotational speed and the target rotational speed and the torque controller outputs a second controlled variable based on the detected drivetrain torque, and wherein the control device controls the at least one electric motor by adding the first and second controlled variables in order to reduce or increase the target torque in the identical direction as a torque resulting from the grinding process.

7. The control device of claim 6, wherein the torque controller comprises a highpass filter and an adjoining filter stage having a differentiating response for amplifying a dynamics of the highpass-filtered drivetrain torque.

8. A vertical mill having a grinding plate rotatable about a vertical axis and drivable by at least one electric motor and a drivetrain comprising at least one gearbox and performing a grinding process, the vertical mill comprising a control device for controlling the drivetrain of the vertical mill, the control device comprising:

an input configured to receive a measured actual rotational speed of the drivetrain and a measured drivetrain torque of the drivetrain torque, and to receive a predefined target rotational speed, and an output supplying an output signal for a target torque based on the measured actual rotational speed of the drivetrain and based on the target rotational speed as well as on the drivetrain torque in such a manner that the resulting target torque is reduced or increased in an identical direction as a torque resulting from the grinding process.

* * * * *